(12) United States Patent
Li et al.

(10) Patent No.: US 11,334,766 B2
(45) Date of Patent: May 17, 2022

(54) NOISE-RESISTANT OBJECT DETECTION WITH NOISY ANNOTATIONS

(71) Applicant: salesforce.com, inc., San Francisco, CA (US)

(72) Inventors: Junnan Li, Singapore (SG); Chu Hong Hoi, Singapore (SG)

(73) Assignee: salesforce.com, inc., San Francisco, CA (US)

( * ) Notice: Subject to any disclaimer, the term of this patent is extended or adjusted under 35 U.S.C. 154(b) by 183 days.

(21) Appl. No.: 16/778,339

(22) Filed: Jan. 31, 2020

(65) Prior Publication Data

US 2021/0150283 A1    May 20, 2021

Related U.S. Application Data

(60) Provisional application No. 62/936,138, filed on Nov. 15, 2019.

(51) Int. Cl.
*G06K 9/62* (2022.01)
*G06N 3/04* (2006.01)
*G06N 3/08* (2006.01)

(52) U.S. Cl.
CPC ........... *G06K 9/6262* (2013.01); *G06K 9/627* (2013.01); *G06K 9/6259* (2013.01); *G06K 9/6261* (2013.01); *G06N 3/04* (2013.01); *G06N 3/08* (2013.01)

(58) Field of Classification Search
CPC .... G06K 9/6262; G06K 9/6259; G06K 9/627; G06K 9/6261; G06K 9/3233; G06K 9/6271; G06N 3/04; G06N 3/08

USPC ......................................................... 382/156
See application file for complete search history.

(56) References Cited

U.S. PATENT DOCUMENTS

| | | | |
|---|---|---|---|
| 5,185,848 A * | 2/1993 | Aritsuka | G10L 15/16 704/202 |
| 10,282,663 B2 | 5/2019 | Socher et al. | |
| 10,346,721 B2 | 7/2019 | Albright et al. | |
| 10,474,709 B2 | 11/2019 | Paulus | |
| 10,521,465 B2 | 12/2019 | Paulus | |
| 10,542,270 B2 | 1/2020 | Zhou et al. | |
| 10,552,944 B2 * | 2/2020 | Wang | G06K 9/6253 |
| 10,635,943 B1 * | 4/2020 | Lebel | G06T 5/50 |

(Continued)

OTHER PUBLICATIONS

Arazo et al., "Unsupervised Label Noise Modeling and Loss Correction," In ICML, arXiv:1904.11238v2, pp. 312-321, 2019.

(Continued)

*Primary Examiner* — Juan A Torres

(74) *Attorney, Agent, or Firm* — Haynes and Boone, LLP

(57) ABSTRACT

Systems and methods are provided for training object detectors of a neural network model with a mixture of label noise and bounding box noise. According to some embodiments, a learning framework is provided which jointly optimizes object labels, bounding box coordinates, and model parameters by performing alternating noise correction and model training. In some embodiments, to disentangle label noise and bounding box noise, a two-step noise correction method is employed. In some examples, the first step performs class-agnostic bounding box correction by minimizing classifier discrepancy and maximizing region objectness. In some examples, the second step uses dual detection heads for label correction and class-specific bounding box refinement.

22 Claims, 7 Drawing Sheets

(56) References Cited

U.S. PATENT DOCUMENTS

| | | | |
|---|---|---|---|
| 2016/0019459 A1* | 1/2016 | Audhkhasi | G06N 3/08 706/22 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher | |
| 2018/0082171 A1 | 3/2018 | Merity et al. | |
| 2018/0096219 A1 | 4/2018 | Socher | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0268287 A1 | 9/2018 | Johansen et al. | |
| 2018/0268298 A1 | 9/2018 | Johansen et al. | |
| 2018/0300317 A1 | 10/2018 | Bradbury | |
| 2018/0336198 A1 | 11/2018 | Zhong et al. | |
| 2018/0336453 A1 | 11/2018 | Merity et al. | |
| 2018/0349359 A1 | 12/2018 | Mccann et al. | |
| 2018/0373682 A1 | 12/2018 | Mccann et al. | |
| 2018/0373987 A1 | 12/2018 | Zhang et al. | |
| 2019/0130206 A1 | 5/2019 | Trott et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0188568 A1 | 6/2019 | Keskar et al. | |
| 2019/0213482 A1 | 7/2019 | Socher et al. | |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0286073 A1 | 9/2019 | Hosseini-Asl et al. | |
| 2019/0295530 A1 | 9/2019 | Hosseini-Asl et al. | |
| 2019/0362020 A1 | 11/2019 | Paulus et al. | |
| 2020/0005765 A1 | 1/2020 | Zhou et al. | |

OTHER PUBLICATIONS

Arpit et al., "A Closer Look at Memorization in Deep Networks," Proceedings of the 34th International Conference on Machine Learning, Sydney, Australia, PMLR 70, 2017, pp. 233-242.

Berthelot et al., "Mixmatch: A Holistic Approach to Semi-Supervised Learning," 33rd Conference on Neural Information Processing Systems (NeurIPS 2019), Vancouver, Canada, pp. 1-11.

Blum et al., "Combining Labeled and Unlabeled Data with Co-training," In the Proceedings of the 11th Annual Conference on Computational Learning Theory, pp. 92-100, 1998.

Chen et al., "MMDetection: Open MMlab Detection Toolbox and Benchmark," arXiv:1906.07155, pp. 1-13, 2019.

Chen et al., "Understanding and Utilizing Deep Neural Networks Trained with Noisy Labels," Proceedings of the 36th International Conference on Machine Learning, Long Beach, California, PMLR 97, pp. 1062-1070, 2019.

Cinbis et al., "Weakly Supervised Object Localization with Multi-Fold Multiple Instance Learning," TPAMI, 39 (1):189-203, 2017.

Deng et al., "Imagenet: A Large-Scale Hierarchical Image Database," In CVPR, pp. 248-255, 2009.

Deselaers et al., "Localizing Objects while Learning their Appearance," In ECCV, pp. 452-466, 2010.

Dietterich et al., "Solving the Multiple Instance Problem with Axis-Parallel Rectangles," Artif Intell., 89(1-2):31-71, 1997.

Everingham et al., "The Pascal Visual Object Classes (VOC) Challenge," IJCV, 88(2):303-338, 2010.

Gao et al., "NOTE-RCNN: NOise Tolerant Ensemble RCNN for Semi-Supervised Object Detection," In ICCV, pp. 9508-9517, 2019.

Girshick, "Fast R-CNN," In Proceedings, of the IEEE International Conference on Computer Vision, pp. 1440-1448, 2015.

Grandvalet et al., "Semi-Supervised Learning by Entropy Minimization," In Advances in Neural Information Processing Systems, pp. 529-536, 2005.

Han et al., "Co-teaching: Robust Training of Deep Neural Networks with Extremely Noisy Labels," In NeurIPS, pp. 8536-8546, 2018.

He et al., "Mask R-CNN" In ICCV, pp. 2961-2969, 2017.

He et al., "Deep Residual Learning for Image Recognition," In CVPR, pp. 770-778, 2016.

Jiang et al., "Acquisition of Localization Confidence for Accurate Object Detection," In ECCV, pp. 816-832, 2018.

Jiang et al., "Mentornet: Learning Data-Driven Curriculum for Very Deep Neural Networks on Corrupted Labels," In ICML, pp. 2309-2318, 2018.

Lee et al., "Cleannet: Transfer Learning for Scalable Image Classifier Training with Label Noise," In CVPR, pp. 5447-5456, 2018.

Lin et al., "Feature Pyramid Networks for Object Detection," In CVPR, pp. 936-944, 2017.

Lin et al., "Microsoft COCO: Common Objects in Context," In ECCV, pp. 740-755, 2014.

Ma et al., "Dimensionality-Driven Learning with Noisy Labels," In ICML, pp. 3361-3370, 2018.

Pereyra et al., "Regularizing Neural Networks by Penalizing Confident Output Distributions," In ICLR Workshop, 2017.

Reed et al, "Training Deep Neural Networks on Noisy Labels with Bootstrapping," In ICLR, 2015.

Ren et al., "Learning to Reweight Examples for Robust Deep Learning," In ICML, pp. 4331-4340, 2018.

Ren et al., "Faster R-CNN: Towards Real-time Object Detection with Region Proposal Networks," In NIPS, pp. 91-99, 2015.

Tanaka et al., "Joint Optimization Framework for Learning with Noisy Labels," In CVPR, pp. 5552-5560, 2018.

Tarvainen et al., "Mean Teachers are Better Role Models: Weight-averaged Consistency Targets Improve Semi-supervised Deep Learning Results," In NIPS, pp. 1195-1204, 2017.

Vahdat, "Toward Robustness against Label Noise in Training Deep Discriminative Neural Networks," In NIPS, pp. 5601-5610, 2017.

Veit et al., "Learning from Noisy Large-scale Datasets with Minimal Supervision," In CVPR, pp. 6575-6583, 2017.

Xiao et al., "Learning from Massive Noisy Labeled Data for Image Classification," In CVPR, pp. 2691-2699, 2015.

Yi et al., "Probabilistic End-to-End Noise Correction for Learning with Noisy Labels," In CVPR, 2019.

Yu et al., "How Does Disagreement Help Generalization against Label Corruption?" In ICML, pp. 7164-7173, 2019.

Zhang et al., "Understanding Deep Learning Requires Rethinking Generalization," In ICLR, 2017.

Zhang et al., "Learning to Localize Objects with Noisy Labeled Instances," In AAAI, pp. 9219-9226, 2019.

\* cited by examiner

300

| |
|---|
| Method: alternating two-step noise correction and model training. |
| 1 Input: model $\Theta = \{\theta_{cnn}, \theta_{rpn}, \theta_d^1, \theta_d^2\}$, noisy training dataset $(\mathcal{X}, \mathcal{Y}, \mathcal{B})$. ⎫ 310 |
| 2 while not MaxIters do |
| 3   Mini-batch $X = \{x\}, Y = \{y\}, B = \{b\}$. |
| 4   for $b$ in $B$ do                         ⎫ 322 |
| 5     Update $b \to b^*$ with CA-BBC (Eq. 2 & 3). |
| 6   end |
| 7   for $(y, b^*)$ in $(Y, B^*)$ do |
| 8     Update $y \to y^*$ with dual-head soft label correction (Eq. 4 & 5).   ⎫ 324 |
| 9     Update $b^* \to b^{**}$ with class-specific bbox refinement (Eq. 6). |
| 10  end |
| 11  Update $\Theta$ by SGD on $L_{rpn}(B^{**}), L_{cls}^1(Y^*), L_{cls}^2(Y^*), L_{loc}^1(B^{**}, Y^*), L_{loc}^2(B^{**}, Y^*)$.   ⎫ 330 |
| 12 end |

(lines 3–10 bracketed as 320)

*FIG. 3*

| BBox Noise | 0% | | | | 20% | | | | 40% | | | |
|---|---|---|---|---|---|---|---|---|---|---|---|---|
| Label Noise | 0% | 20% | 40% | 60% | 0% | 20% | 40% | 60% | 0% | 20% | 40% | 60% |
| Vanilla [27, 5] | 78.2 | 72.9 | 69.3 | 62.1 | 75.5 | 70.7 | 66.9 | 61.2 | 59.3 | 54.2 | 50.0 | 45.9 |
| Co-teaching [13] | 78.3 | 76.5 | 74.1 | 69.9 | 75.6 | 73.2 | 69.7 | 65.1 | 60.6 | 59.7 | 55.8 | 50.4 |
| SD-LocNet [36] | 78.0 | 75.3 | 73.0 | 66.2 | 75.3 | 72.1 | 67.5 | 64.0 | 59.7 | 58.7 | 54.5 | 49.2 |
| NOTE-RCNN [12] | 78.6 | 76.7 | 74.9 | 69.9 | 76.0 | 73.7 | 70.1 | 65.8 | 63.4 | 61.5 | 57.8 | 53.7 |
| Ours | 80.1 | 79.1 | 77.7 | 74.1 | 77.9 | 76.7 | 74.8 | 71.9 | 71.9 | 70.6 | 69.1 | 64.5 |

FIG. 7A

| Noise | Method | Vanilla [27, 5] | Co-teaching [13] | SD-LocNet [36] | NOTE-RCNN [12] | Ours | Clean |
|---|---|---|---|---|---|---|---|
| $N_l = 20\%$ | mAP@.5 | 47.9 | 49.7 | 49.3 | 50.4 | 53.5 | 54.5 |
| $N_b = 20\%$ | mAP@[.5, .95] | 23.9 | 24.6 | 24.5 | 25.1 | 27.7 | 31.4 |
| $N_l = 40\%$ | mAP@.5 | 29.7 | 35.9 | 35.1 | 38.3 | 47.4 | 54.5 |
| $N_b = 40\%$ | mAP@[.5, .95] | 10.3 | 14.6 | 13.9 | 15.2 | 21.2 | 31.4 |

FIG. 7B

| Forward Correction | Dual Heads | CA BBC | Dual Inference | BBox Noise 0% | | | BBox Noise 20% | | | BBox Noise 40% | | |
|---|---|---|---|---|---|---|---|---|---|---|---|---|
| | | | | Label 20% | Label 40% | Label 60% | Label 20% | Label 40% | Label 60% | Label 20% | Label 40% | Label 60% |
| ✓ | | | | 78.9 | 77.4 | 73.4 | 75.9 | 73.6 | 68.8 | 67.2 | 65.3 | 59.1 |
| ✓ | ✓ | | | 79.1 | 77.7 | 74.1 | 76.2 | 74.1 | 69.8 | 67.9 | 66.0 | 60.3 |
| ✓ | ✓ | ✓ | | 79.1 | 77.7 | 74.1 | 76.7 | 74.8 | 71.9 | 70.6 | 69.1 | 64.5 |
| ✓ | ✓ | ✓ | ✓ | 79.6 | 78.3 | 74.8 | 77.3 | 75.2 | 72.5 | 71.3 | 69.8 | 65.4 |

FIG. 8

NOISE-RESISTANT OBJECT DETECTION WITH NOISY ANNOTATIONS

RELATED APPLICATIONS

This application claims priority to U.S. Provisional Patent Application No. 62/936,138, filed Nov. 15, 2019, which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to machine learning models and neural networks, and more specifically, to noise-resistant object detection with noisy annotations.

BACKGROUND

Artificial intelligence, implemented with neural networks and deep learning models, has demonstrated great promise as a technique for automatically analyzing real-world information with human-like accuracy. Image processing, including the detection of various objects within an image, is one class of problems to which neural networks may be applied. Training deep object detectors of a neural network or deep learning model typically requires significant human labeling effort to develop a high-quality training set, in particular, by manually identifying objects in various images with respective bounding boxes and labeling each object appropriately. Noisy annotations are more easily accessible or obtained, but they are detrimental for learning.

BRIEF DESCRIPTION OF THE DRAWINGS

FIG. 3 is a simplified diagram of a method for alternating multi-step noise correction and model training according to some embodiments.

FIGS. 7A and 7B illustrates example results of the framework for alternately performing noise correction and model training of the present disclosure compared to other approaches, according to some embodiments.

FIG. 8 illustrates example results of an ablation study, according to some embodiments.

Figure 1:
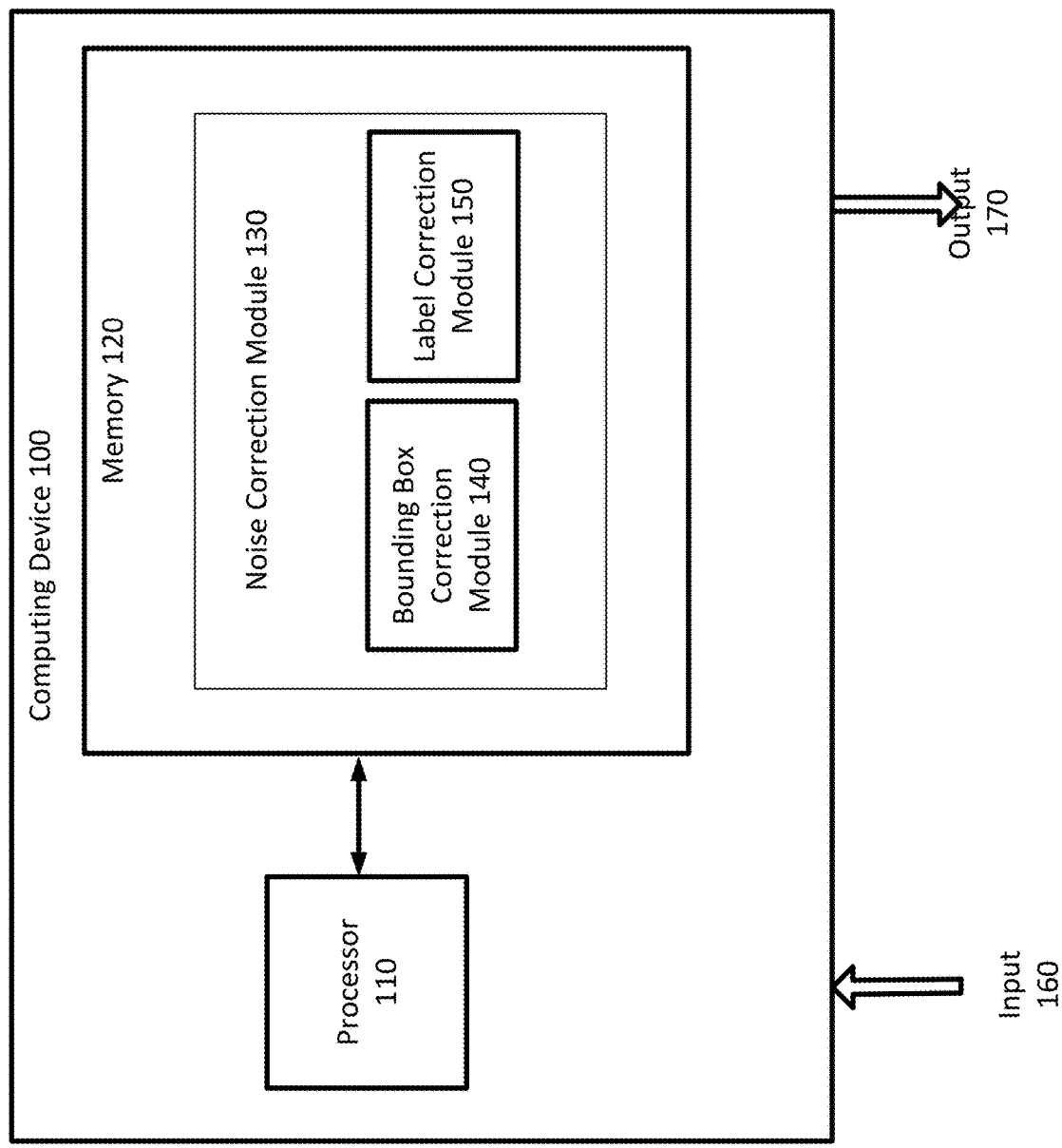
FIG. 1 is a simplified diagram of a computing device according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

Artificial intelligence, implemented with neural networks and deep learning models, has demonstrated great promise as a technique for automatically analyzing real-world information with human-like accuracy. In general, such neural network and deep learning models receive input information and make predictions based on the same. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications.

Image processing, including the detection of various objects within an image, is one class of problems to which neural networks may be applied. Training deep object detectors of a neural network or deep learning model typically requires significant human labeling effort to develop a high-quality training set, in particular, by manually identifying objects in various images with respective bounding boxes and labeling each object appropriately. A bounding box can define a region or area of an image associated with an object (i.e., the area of an image in which an object is found). A label can be a description for the object. Noisy annotations are more easily accessible or obtained, but they are detrimental for learning.

The present disclosure provides systems and methods for addressing the problem of training object detectors with a mixture of label noise and bounding box noise. According to some embodiments, a learning framework is provided which jointly optimizes object labels, bounding box coordinates, and model parameters by performing alternating noise correction and model training. In some embodiments, to disentangle label noise and bounding box noise, a two-step noise correction method is employed. In some examples, the first step performs class-agnostic bounding box correction by minimizing classifier discrepancy and maximizing region objectness. In some examples, the second step uses dual detection heads for label correction and class-specific bounding box refinement. Experiments have shown that the systems and methods of the present disclosure achieve state-of-the-art performance by effectively cleaning the annotation noise.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Computing Device

According to some embodiments, the systems of the present disclosure—including the various networks, models, and modules—can be implemented in one or more computing devices.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a noise correction module 130 that may be used to implement and/or emulate the neural network systems and models described further herein and/or to implement any of the methods described further herein. Noise correction module 130 may be used, in some examples, for performing alternating noise correction in one or more annotated images and model training using the same. In some embodiments, noise correction module 130 may include a bounding box correction module 140 and a label correction module 150. In some embodiments, computing device 100 implements, provides, or supports a learning framework or approach which jointly optimizes object labels, bounding box coordinates, and model parameters by performing alternating noise correction and model training. In some embodiments, in this framework, bounding box correction module 140 performs class-agnostic bounding box correction of noisy image data by minimizing classifier discrepancy and maximizing region objectness, and label correction module 150 uses dual detection heads for label correction of the noisy image data and class-specific bounding box refinement.

In some examples, memory 120 may include non-transitory, tangible, machine readable media that includes executable code that when run by one or more processors (e.g., processor 110) may cause the one or more processors to perform the methods described in further detail herein. In some examples, noise correction module 130, bounding box correction module 140, and/or label correction module 150 may be implemented using hardware, software, and/or a combination of hardware and software. As shown, computing device 100 receives input 160, which is provided to noise correction module 130. Input 160 may include a training dataset with images and noisy annotations. Noise correction module 130 may generate output 170, which can include corrected annotations.

Learning Framework or Approach for Object Detection with Noisy Annotations

According to some embodiments, systems and methods implement a robust learning framework or approach for object detection with noise annotations.

Figure 2:
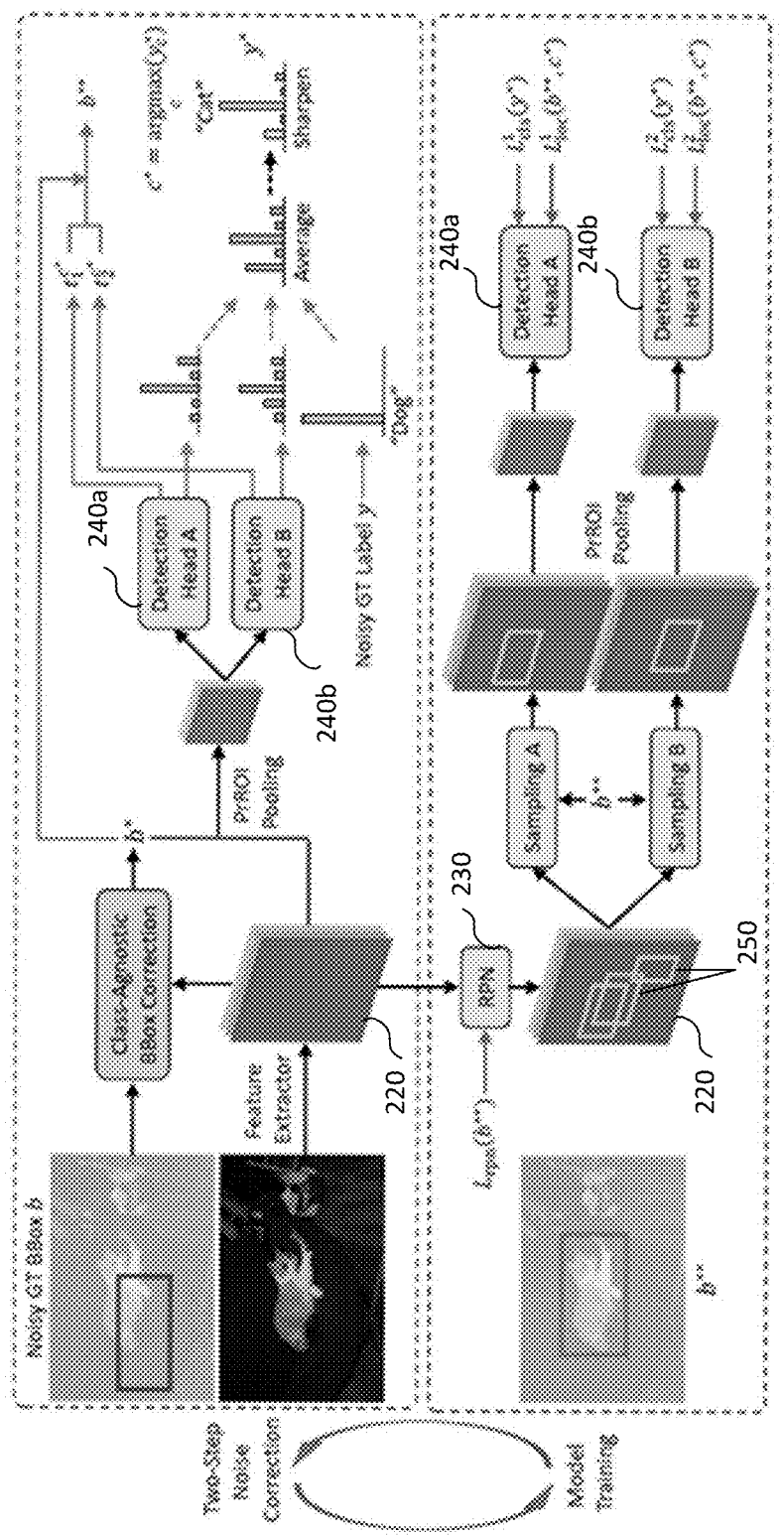
FIG. 2 is a simplified diagram of a framework for alternately performing noise correction and model training according to some embodiments.

FIG. 2 is a simplified diagram of the learning framework 200, according to some embodiments. The framework 200 jointly optimizes object labels, bounding box coordinates, and model parameters by performing alternating noise correction and training of a neural network model. In some embodiments, framework 200 may be implemented at least in part by noise correction module 130, and its components bounding box correction module 140 and label correction module 150 (FIG. 1). In some embodiments, framework 200 may be implemented based on the MMdetection toolbox, as described in more detail in Chen et al., "MMDetection: Open mmlab detection toolbox and benchmark," arXiv preprint arXiv:1906.07155 (2019), which is incorporated by reference herein.

FIG. 3 is a simplified diagram of a method 300 for alternating two-step noise correction and model training, according to some embodiments. In some embodiments, method 300 corresponds to the operation or method (or portions thereof) performed or used by framework 200 or noise correction module 130 to correct noisy bounding boxes and labels in various images, and perform model training using the same.

One or more of the processes of method 300 may be implemented, at least in part, in the form of executable code stored on non-transitory, tangible, machine-readable media that when run by one or more processors may cause the one or more processors (e.g., processor 110) of a computing device (e.g., computing device 100) to perform one or more of the processes. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Referring to FIGS. 1 through 3, at a process 310, the method 300, framework 200 receives as input the neural network model $\Theta = \{\theta_{cnn}, \theta_{rpn}, \theta_d^1, \theta_d^2\}$, and a training dataset with images X, noisy object labels Y, and noisy bounding boxes B. In some embodiments, the framework 200 is configured to train an object detector parameterized by model $\Theta$, by jointly optimizing the noisy object labels Y, noisy bounding boxes B, and the model $\Theta$.

The neural model $\Theta$ includes or uses an object detector, which in some embodiments, can be implemented with a Region-based Convolutional Neural Network (R-CNN), such as, for example, Faster-RCNN (as described in more detail in Ren et al., "Faster R-CNN: towards real-time object detection with region proposal networks," In NIPS, pages 91-99 (2015), which is incorporated by reference herein). In some embodiments, the object detector can be a multi-stage object detector. In some embodiments, the multi-stage object detector includes a backbone feature extractor 220 with parameters $\theta_{cnn}$, a Region Proposal Network (RPN) 230 with parameters $\theta_{rpn}$, and one or more detection heads 240a, 240b.

In some embodiments, the RPN 230 takes an image (of any size) as input and outputs a set of rectangular object proposals 250 (for bounding boxes), each with an objectness score. "Objectness" measures membership to a set of object classes versus background.

In some embodiments, each detection head 240a, 240b may include a classification head with parameters $\theta_c$, and a bounding box (bbox) regression head with parameters $\theta_b$. The bbox regression head may generate a prediction for a bounding box of an object in an image, and the classification head may generate a prediction for a classification or label to assign to the object in the bounding box. In some embodiments, the classification head $\theta_c$ and bbox regression head $\theta_b$ of a detection head 240 have shared layers. Let detection head 240 with parameters $\theta_d$ denote the union of the classification head $\theta_c$ and the bbox regression head $\theta_b$.

In the framework 200, the model $\Theta$ is first warmed-up, by training the object detector using the original noisy annotations Y and B. After the warm-up, the framework 200 alternatingly performs optimization on the annotations and training of the model. In some embodiments, this alternating noise correction and model training is performed in mini-batches of data, over multiple iterations (e.g., up to MaxIters). Specifically, at a process 320 of method 300, for each mini-batch of data $X=\{x\}$, $Y=\{y\}$, $B=\{b\}$, the framework 200 first keeps model $\Theta$ fixed and performs noise correction to update Y and B. Then, at a process 330 of method 300, the framework 200 uses the corrected annotations to update the model $\Theta$.

During training, framework 200 can simultaneously train the two detection heads $\theta_d^1 = \{\theta_c^1, \theta_b^1\}$ and $\theta_d^2 = \{\theta_c^2, \theta_b^2\}$, which, in some embodiments, are kept diverged from each other by different parameter initializations and different training instance (i.e., RoI) sampling. The dual detection heads—each comprising a classification head $\theta_c$ and bbox regression head $\theta_b$—are utilized to correct annotation noise (e.g., label noise, or bounding box (bbox) noise).

Due to the entanglement of an unknown mixture of label noise and bbox noise, it can be difficult to correct both types of annotation noise in a single step. Thus, according to some embodiments, the system or framework 200 implements a two-step noise correction method. In the first step, framework 200 performs class-agnostic bounding box correction (CA-BBC), which disentangles bbox noise and label noise by directly optimizing the noisy GT boxes regardless of their class labels. In the second step, framework 200 utilizes the outputs from dual detection heads for label noise correction and class specific bbox refinement. The updated annotations may then be used to train the neural network model $\Theta$, in particular, for detecting various objects within images.

Class-Agnostic Bounding Box Correction

In a first step or process 322 of method 300, the framework 200 performs class-agnostic bounding box correction (CA-BBC). In particular, in some embodiments, framework 200 corrects bounding box noise by updating $B \rightarrow B^*$ regardless of the label noise in Y. In this way, the operation is class-agnostic, as it does not consider the class or label assigned to the object. In some embodiments, CA-BBC is performed or implemented by bounding box correction module 140.

Figure 4:
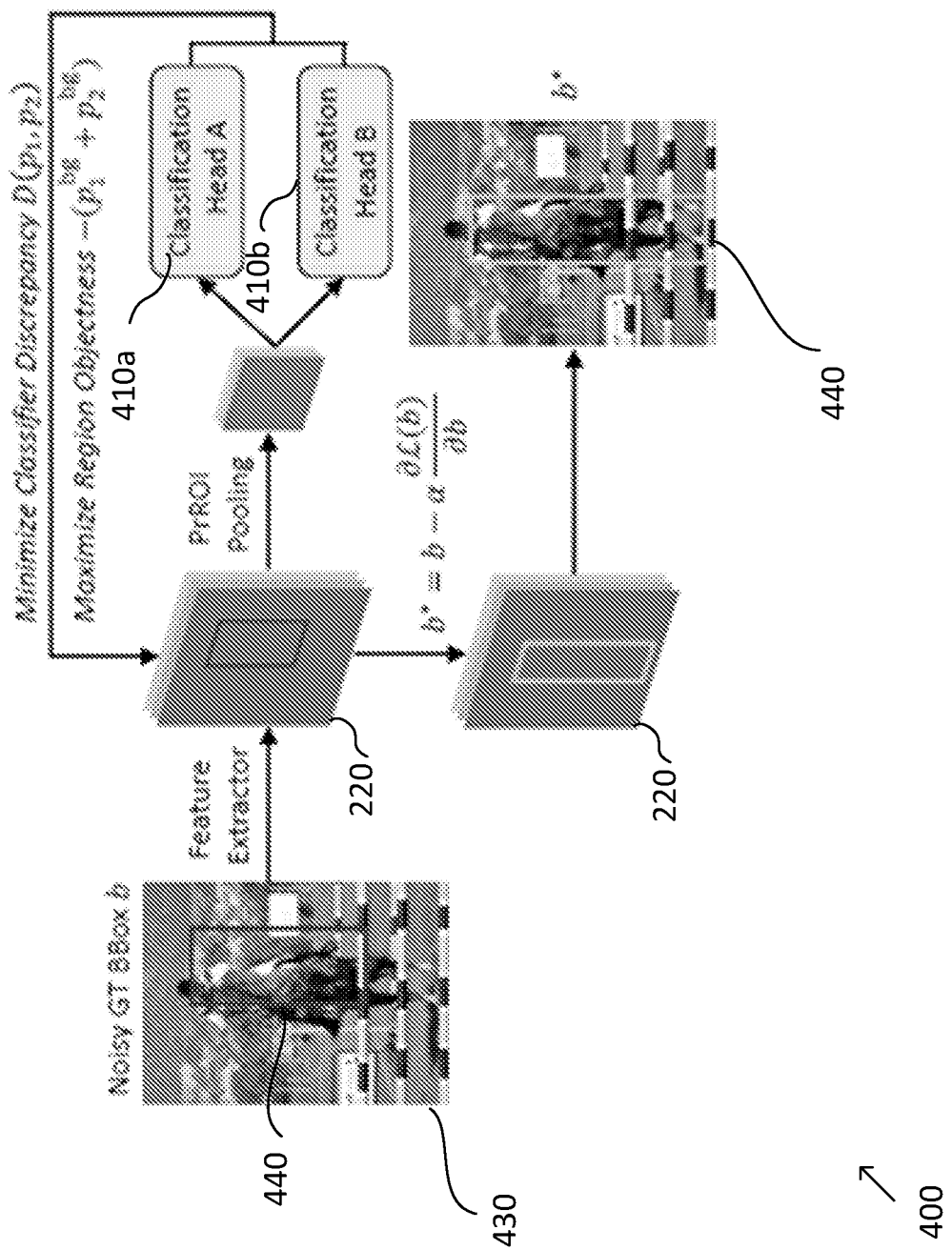
FIG. 4 is a simplified diagram of a framework for class agnostic bounding box correction according to some embodiments.

Class-agnostic bounding box correction is illustrated, for example, with reference to FIG. 4. As shown in FIG. 4, in some embodiments, CA-BBC uses two diverged classification heads (Classification Head A 410a and Classification Head B 410b) to produce two sets of class predictions on the same image region 430. The framework 400 updates the bounding box 440 to minimize classifier discrepancy and maximize region objectness. The expectation is that if a bounding box tightly covers an object, then the two classifiers (Classification Head A 410a and Classification Head B 410b) would agree with each other and produce the same predictions. Moreover, both predictions would have low scores on the background class, i.e., high objectness scores.

Specifically, in some embodiments, given an image $x \in X$, the backbone feature extractor 220 first extracts a convolutional feature map. For each noisy ground truth (GT) bounding box $b \in B$, framework 400 performs a Region of Interest (RoI)-Pooling operation on the feature map to extract a fixed-sized feature $\phi(x, b^*)$. The extracted RoI feature is provided to the two classification heads 410a, 410b to produce two sets of softmax predictions over C+1 classes (including the background class), $p_1(\phi(x, b); \theta_c^1)$ and $p_2(\phi(x, b); \theta_c^2)$. For simplicity, these predictions of class can be denoted as $p_1$ and $p_2$. The discrepancy $\mathcal{D}$ between the two predictions $p_1, p_2$ is defined as their L2 distance:

$$\mathcal{D}(p_1, p_2) = \|p_1 - p_2\|_2^2. \quad (1)$$

Minimizing the classifier discrepancy $\mathcal{D}(p_1, p_2)$ with respect to the bounding box 440 will push the bounding box to a region where the two classifiers 410a-b agree on its class label. To prevent the bounding box 440 from simply moving to a background region of image 430, framework 200 may also minimize the classifiers' scores on the background class, $p_1^{bg}$ and $p_2^{bg}$. In other words, framework 200 maximizes the objectness of the region covered by the bounding box 440.

Therefore, framework 200 aims to find the optimal bounding box b* that minimizes the following objective loss function:

$$\mathcal{L}(b) = \mathcal{D}(p_1, p_2) + \lambda(p_1^{bg} + p_2^{bg}), \quad (2)$$

where $\lambda$ controls the balance of the two terms and, in some embodiments, is set to 0.1 in the experiments.

For faster speed, in some embodiments, framework 200 estimates bounding box b* by performing a single step of gradient descent to update bounding box b:

$$b^* = b - \alpha \frac{\partial \mathcal{L}(b)}{\partial b}, \quad (3)$$

where α is the step size.

Since the techniques of RoI-Pooling or RoI-Align perform discrete sampling on the feature map to generate φ(x, b), loss $\mathcal{L}(b)$ is not differentiable with respect to bounding box b. Therefore, in some embodiments, the framework 200 adopts the Precise RoI-Pooling method (as described in further detail in Jiang et al., "Acquisition of localization confidence for accurate object detection," In *ECCV*, pages 816-832 (2018), incorporated by reference herein), which avoids any quantization of coordinates and has a continuous gradient on b.

In some embodiments, it is observed that the entropy of the classification heads' predictions over object classes would decrease after updating b to b*. A lower entropy suggests that the classifiers are more confident of their predicted object class, which may verify the assumption that b* contains representative information for one and only one object.

Figure 5:
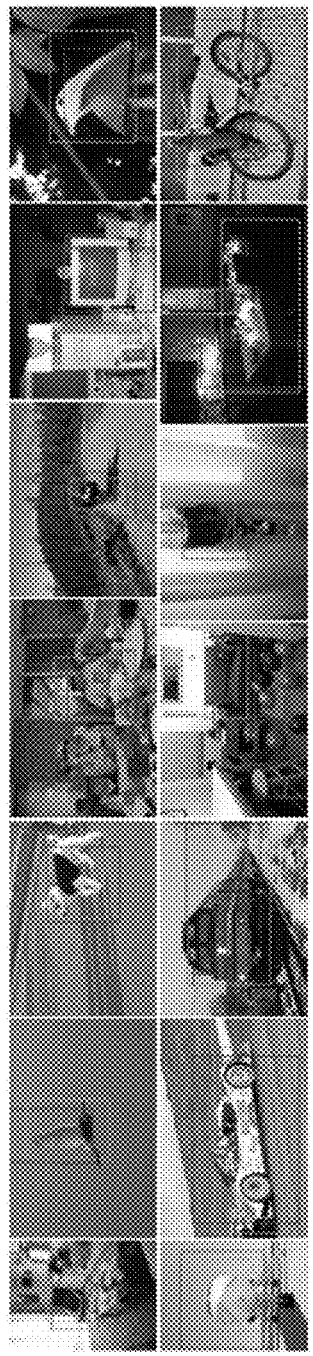
FIG. 5 illustrates examples of class-agnostic bounding box correction according to some embodiments.

FIG. 5 illustrates examples 500 of class-agnostic bounding box correction (CA-BBC) performed by framework on PASCAL VOC dataset with 40% label noise and 40% bounding box noise. Both noisy GT bounding boxes and the corrected bounding boxes are shown.

Dual-Head Noise Correction

In some embodiments, the framework 200 simultaneously trains two diverged heads (e.g., detection heads 240a, 240b, each including a respective classification head and bbox regression head) with distinct abilities to filter different types of noise, and uses their ensemble to clean the annotation noise. In some embodiments, the systems and methods distill knowledge from each detection head 240a, 240b to teach the other. That is, in some examples, co-teaching is employed in the dual-head network, where each detection head selects box samples with small classification loss to train the other head. This helps alleviate the confirmation bias problem (i.e., a model confirms its own mistakes) and achieves robustness to noise. In some embodiments, the Region Proposal Network (RPN) 230 is trained on all boxes.

Thus, in a second step or process 324 of method 300, the framework 200 performs label Y noise correction and class-specific bounding box B refinement, utilizing the outputs from dual detection heads 240a, 240b.

Label correction. In some embodiments, given the Region of Interest (RoI) feature φ(x, b*), the two classification heads (e.g., which may be part of or incorporated in detection heads 240a, 240b) produce two sets of softmax predictions over object classes, $p_1^*$ and $p_2^*$. Considering the bootstrapping method (as described in more detail in Reed et al., "Training deep neural networks on noisy labels with bootstrapping," In *ICLR* (2015), which is incorporated by reference herein), in some embodiments, the framework 200 uses the classifiers' predictions to update the noisy GT label (e.g., label "Dog" in FIG. 2). Let $y \in \{0; 1\}^C$ represent the GT label as a one-hot vector over C classes. In some embodiments, the soft label is created by first averaging the classifiers' predictions and the GT label:

$$\bar{y} = (p_1^* + p_2^* + y)/3. \quad (4)$$

Then a sharpening function may be applied on the soft label to reduce the entropy of the label distribution (e.g., changing label to "Cat" in FIG. 2). The sharpening operation is defined as:

$$y^* = \bar{y}^{c\frac{1}{T}} / \sum_{c=1}^{C} \bar{y}^{c\frac{1}{T}}, c = 1, 2, \ldots, C, \quad (5)$$

where $\bar{y}^c$ is the score for class c. The temperature T controls the "softness" of the text label and, in some examples, is set to 0.4 in experiments. A lower temperature decreases the softness and has the implicit effect of entropy minimization, which encourages the model Θ to produce high confidence predictions and allows better decision boundary to be learned.

Class-specific bounding box refinement. In some embodiments, for class-specific bounding box refinement, the framework 200 directly regresses the noisy ground-truth (GT) bounding box to minimize both classifier discrepancy and background scores. The two bbox regression heads (e.g., which may be part of or incorporated in detection heads 240a, 240b) produce two sets of per-class bounding box regression offsets, t1 and t2. Let c* denote the class with the highest score in the soft label, i.e. $c^* = \arg\max_c y_c^*$, where c=1, 2, . . . , C. In some embodiments, the bounding box b* is refined by merging the class-specific outputs from both bbox regression heads:

$$t = (t_1^{c^*} + t_2^{c^*})/2$$

$$b^{**} = b^* + \rho t, \quad (6)$$

where $t_1^{c^*}$ and $t_2^{c^*}$ are the bounding box offsets for class c*, and ρ controls the magnitude of the refinement. b is the refined, class-specific bounding box. b serves as a new ground truth, and may be compared against random sampling of potential bounding boxes, e.g., Sampling A and Sampling B, for training of the model Θ. In some examples, Sampling A and Sampling B are not the same.

Figure 6:
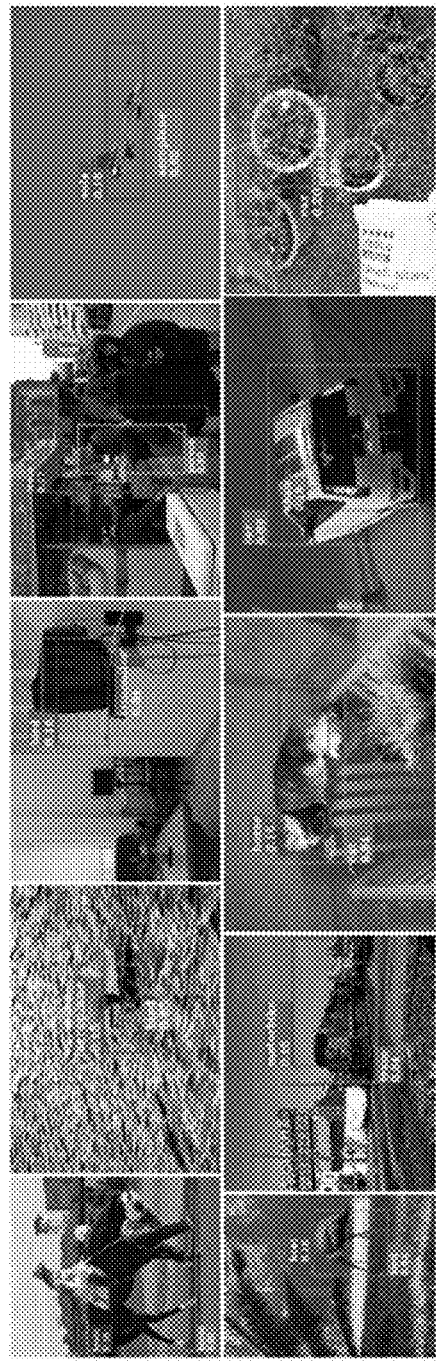
FIG. 6 illustrates examples of dual-head noise correction according to some embodiments.

FIG. 6 illustrates examples 600 of dual-head noise correction on the PASCAL VOC dataset with 40% label noise and 40% bounding box noise. Noisy GT bounding boxes and the corrected bounding boxes are both illustrated.

Model Training

After performing noise correction (with fixed model parameters) for a given mini-batch, the framework 200 next trains or updates the model (with corrected annotations) at process 330. Let Y* and B denote a mini-batch of soft labels and refined bounding boxes, respectively. In some embodiments, these are used as the new ground-truths (GT) to train the model Θ. Specifically, referring to FIGS. 2 and 3, in some embodiments, the framework 200** updates model $\Theta = \{\theta_{cnn}, \theta_{rpn}, \theta_d^1, \theta_d^2\}$ to optimize various losses. In some embodiments, these losses may include following:

(1) the loss function of region proposal networks (RPN), $L_{rpn}(B^{**})$;

(2) the classification loss for the two detection heads, $L_{cls}^1(Y^*)$ and $L_{cls}^2(Y^*)$, defined as the cross-entropy loss $\Sigma_i - y_i^* \log(p_i)$; and (3) the localization loss for the two detection heads, $L_{loc}^1(B^{**}, Y^*)$ and $L_{loc}^2(B^{**}, Y^*)$, defined as the smooth L1 loss.

In some embodiments, the model Θ is trained using Stochastic Gradient Descent (SGD) with a learning rate of 0.02, a momentum of 0.9, and a weight decay of 1e-4. The hyper-parameters are set as λ=0:1, T=0:4, ρ=0:5, and α∈{0, 100, 200}, which are determined by the validation performance on 10% of training data with clean annotations (only used for validation).

After updating the model Θ for the current mini-batch, the method 300 returns to process 320 for noise correction on the next mini-batch, and then process 330 for further model training/updating. Processes 320 and 330 are repeated for the remaining mini-batches until the last mini-batch (e.g., MaxIters) has been processed. Thereafter, the model Θ may be applied for detecting and labeling objects in various images, for example, by generating respective bounding boxes and labeling each object appropriately.

Experiment and Results

Experiments on the systems and methods employing or implementing the framework or model for two-step noise correction were conducted. In some examples, for the experiments, the training data of two popular benchmark datasets, PASCAL VOC 2007 and MS-COCO were corrupted with both label noise and bounding box noise corrupt. Results on these systems and methods employing or implementing the framework or model of the present disclosure may be compared against other methods or approaches for learning with noisy annotations. In some examples, these other approaches include Vanilla, Co-teaching, SD-LocNet, and Note-RCNN.

Table 700 of FIG. 7A shows the comparison results on PASCAL VOC dataset, where the training data contains different mixtures of label noise and bbox noise. The framework and method of the present disclosure (labeled "Ours") significantly outperforms all other methods across all noise settings. Table 750 of FIG. 7B shows the comparison results on the MS-COCO dataset as between framework and method of the present disclosure and other methods.

An ablation study may be conducted to dissect the framework and method of the present disclosure and provide qualitative results. Table 800 of FIG. 8 shows the results of an ablation study to examine the effect of each component in the framework—i.e., forward correction, dual heads, class-agnostic bounding box correction (CA-BBC), and dual inference. Numbers indicate mAP@:5 on PASCAL VOC 2007 test set. As seen in FIG. 8, the results validate the efficacy of the CA-BBC and dual-head noise correction method. Ensemble of the two detection heads during inference can further boost performance.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer-implemented method for training a neural network model for object detection, the method comprising:
   receiving data for one or more images and corresponding annotations for bounding boxes and labels associated with the images, wherein the annotations include label noise and bounding box noise;
   performing, using diverged classification heads, bounding box correction to correct the bounding box noise regardless of the label noise;
   performing, using the diverged classification heads, label correction to correct the label noise;
   performing, using bounding box regression heads, class-specific bounding box refinement on the corrected bounding boxes; and
   training the neural network model for object detection using the corrected labels and refined bounding boxes.

2. The method of claim 1, wherein performing bounding box correction comprises producing respective sets of class predictions by each classification head.

3. The method of claim 1, wherein performing bounding box correction comprises maximizing objectness of a region covered by the bounding box.

4. The method of claim 1, wherein the neural network model comprises a Region-based Convolutional Neural Network (R-CNN).

5. The method of claim 1, wherein the data for one or more images and corresponding annotations are received in one or more mini-batches.

6. The method of claim 1, wherein performing label correction comprises producing respective sets of softmax predictions over object classes.

7. The method of claim 1, wherein training the neural network model comprises optimizing a classification loss for the diverged classification heads.

8. The method of claim 2, wherein performing bounding box correction comprises minimizing the discrepancy between the respective sets of class predictions produced by the classification heads.

9. The method of claim 5, wherein training the neural network model for object detection is performed for each mini-batch of the one or more mini-batches.

10. The method of claim 6, wherein performing label correction comprises averaging the softmax predictions to create a soft label.

11. The method of claim 10, wherein performing label correction comprises applying a sharpening function on the soft label.

12. A non-transitory machine-readable medium comprising executable code which when executed by one or more processors associated with a computer are adapted to cause the one or more processors to perform a method for training a neural network model for object detection comprising:
   receiving data for one or more images and corresponding annotations for bounding boxes and labels associated with the images, wherein the annotations include label noise and bounding box noise;

performing, using diverged classification heads, bounding box correction to correct the bounding box noise regardless of the label noise;

performing, using the diverged classification heads, label correction to correct the label noise;

performing, using bounding box regression heads, class-specific bounding box refinement on the corrected bounding boxes; and training the neural network model for object detection using the corrected labels and refined bounding boxes.

13. The non-transitory machine-readable medium of claim 12, wherein performing bounding box correction comprises producing respective sets of class predictions by each classification head.

14. The non-transitory machine-readable medium of claim 13, wherein performing bounding box correction comprises minimizing the discrepancy between the respective sets of class predictions produced by the classification heads.

15. The non-transitory machine-readable medium of claim 13, wherein performing bounding box correction comprises maximizing objectness of a region covered by the bounding box.

16. The non-transitory machine-readable medium of claim 13, wherein the neural network model comprises a Region-based Convolutional Neural Network (R-CNN).

17. The non-transitory machine-readable medium of claim 13, wherein the data for one or more images and corresponding annotations are received in one or more mini-batches.

18. The non-transitory machine-readable medium of claim 13, wherein performing label correction comprises producing respective sets of softmax predictions over object classes.

19. The non-transitory machine-readable medium of claim 13, wherein training the neural network model comprises optimizing a classification loss for the diverged classification heads.

20. The non-transitory machine-readable medium of claim 17, wherein training the neural network model for object detection is performed for each mini-batch.

21. The non-transitory machine-readable medium of claim 18, wherein performing label correction comprises averaging the softmax predictions to create a soft label.

22. The non-transitory machine-readable medium of claim 21, wherein performing label correction comprises applying a sharpening function on the soft label.

* * * * *